July 14, 1959 G. M. RAPATA 2,895,003
STRAIN RELIEF GROMMET
Filed March 21, 1955 2 Sheets-Sheet 1
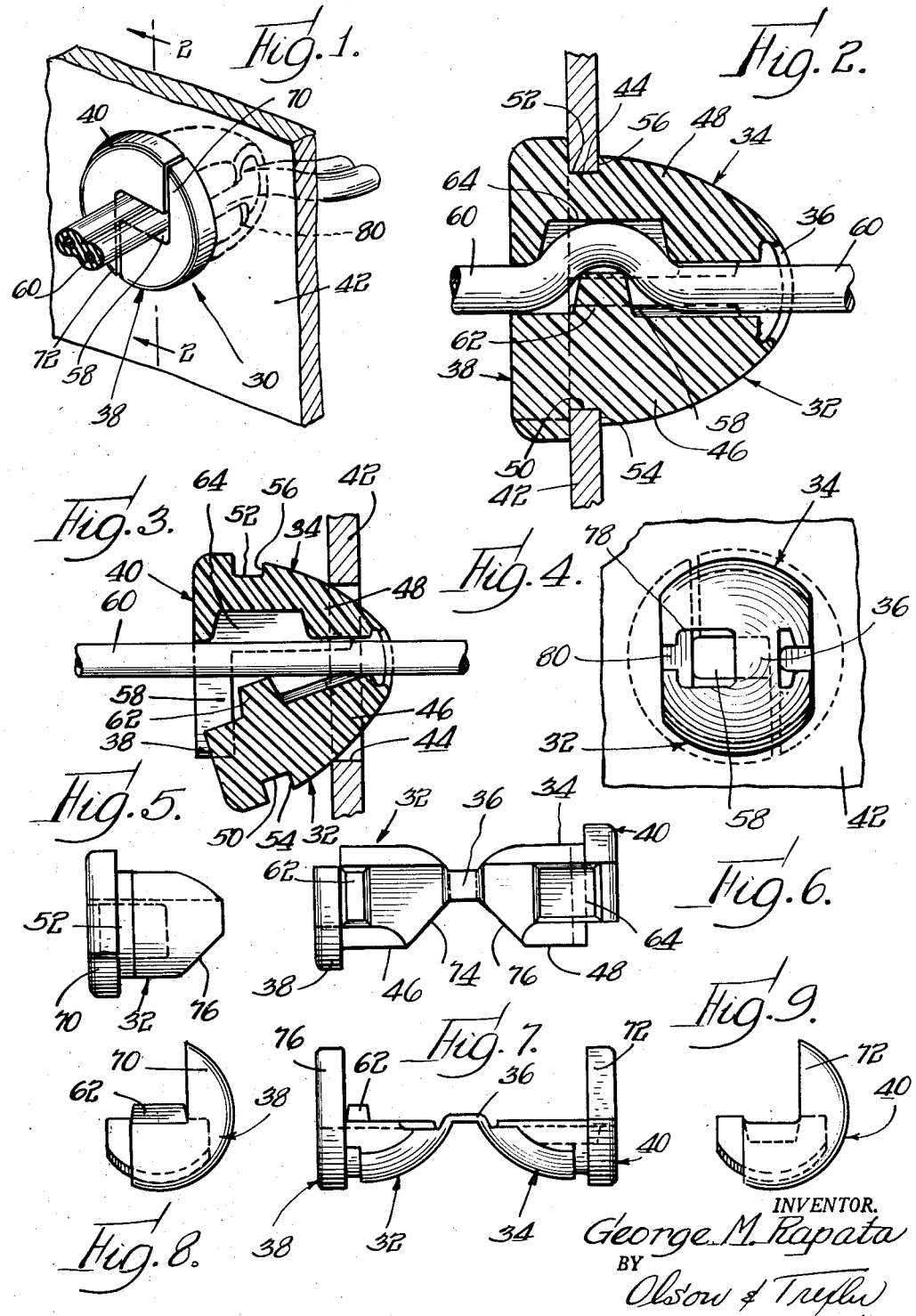
INVENTOR.
George M. Rapata
BY
Olson & Trexler
attys.

July 14, 1959 G. M. RAPATA 2,895,003
STRAIN RELIEF GROMMET
Filed March 21, 1955 2 Sheets-Sheet 2
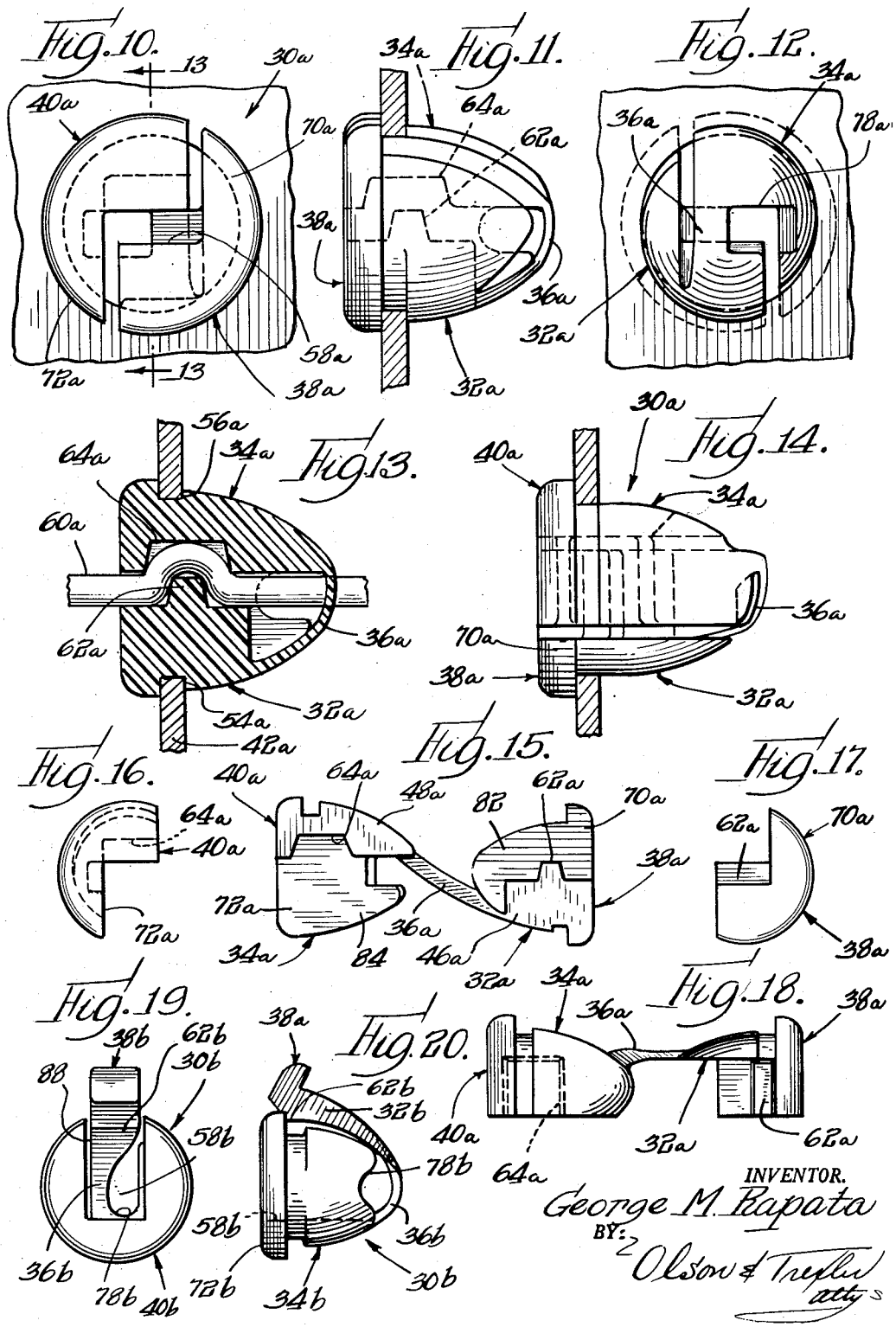
INVENTOR.
George M. Rapata
BY:
Olson & Trexler
attys United States Patent Office 2,895,003
Patented July 14, 1959

2,895,003

STRAIN RELIEF GROMMET

George M. Rapata, Chicago, Ill., assignor to Illinois Tool Works, Chicago, Ill., a corporation of Illinois Application March 21, 1955, Serial No. 495,661

6 Claims. (Cl. 174—153)

The present invention relates to a novel grommet adapted to be applied to an apertured workpiece or panel, and more particularly, to a novel strain relief grommet adapted to secure an elongated element such as an electrical conductor passing through the aperture in the workpiece.

The present invention contemplates the provision of a grommet having a pair of body members which may be assembled together and around an element such as an electrical conductor to be retained. It is an object of the present invention to provide a novel grommet of this type which may be easily and economically manufactured in one piece and which is constructed so that the body portions may be easily assembled with each other.

Another object of the present invention is to provide a novel one-piece grommet of the above described type wherein the body portions are integrally interconnected by a flexible strap or hinge element, which body portion and hinge element are constructed and arranged so as to facilitate insertion of the entering end of the grommet into an apertured workpiece.

Still another object of the present invention is to provide a novel grommet of the above described type which may be easily applied to an apertured workpiece after the body portions have been assembled around the electrical conductor and before said body portions have been shifted together so as to grip the conductor tightly, and which grommet is constructed so that the body portions will be shifted together to grip the conductor during application of the grommet to the apertured workpiece.

Other objects and advantages of the present invention will become apparent from the following description and the accompanying drawings wherein:

Fig. 1 is a perspective view showing a strain relief grommet embodying the principles of this invention applied to an apertured panel and holding an electrical conductor;

Fig. 2 is an enlarged sectional view taken along line 2—2 in Fig. 1;

Fig. 3 is a sectional view similar to Fig. 2 but showing how the grommet may be applied to the electrical conductor and the apertured panel;

Fig. 4 is an entering end view of the grommet applied to the panel;

Fig. 5 is a plan view of the novel grommet;

Fig. 6 is a plan view of the grommet as originally molded and before the body portions have been assembled together;

Fig. 7 is a side elevational view of the grommet as shown in Fig. 6;

Fig. 8 is a head end view of one of the grommet body portions;

Fig. 9 is a head end view of the other of the grommet body portions;

Fig. 10 is a head view showing a grommet embodying a modified form of the present invention applied to an apertured panel;

Fig. 11 is a side elevational view of the grommet of Fig. 10 applied to an apertured panel;

Fig. 12 is an entering end view of the modified grommet applied to an apertured panel;

Fig. 13 is a section view taken along line 13—13 in Fig. 10;

Fig. 14 is a plan view of the modified grommet;

Fig. 15 is a plan view of the modified grommet as originally molded and before the body portions have been assembled together;

Fig. 16 is a head end view of one of the body portions of the modified grommet;

Fig. 17 is a head end view of the other body portion of the modified grommet;

Fig. 18 is a side elevational view of the modified grommet in the condition shown in Fig. 15;

Fig. 19 is a head end view of a grommet embodying another modified form of the present invention; and Fig. 20 is a side elevational view of the grommet shown in Fig. 19.

Referring now more specifically to the drawings wherein like parts are designated by the same numerals throughout the various figures, a grommet 30 embodying one form of the present invention is shown in Figs. 1 through 9. The grommet 30 may be easily and economically molded in one piece from any suitable resilient plastic material such as nylon. The grommet 30 includes a pair of complementary body portions 32 and 34 which are integrally joined by a hinge portion 36, which portions are formed so that they may be molded in a simple split die, and these portions are initially molded in the flattened out condition illustrated in Figs. 6 and 7.

The body portions 32 and 34 have complementary head sections 38 and 40 which are adapted to overlie the outer surface of a panel or workpiece 42 and cover the aperture 44 in the workpiece. The body portions are also provided with complementary shank sections 46 and 48 adapted to be inserted through the panel aperture in the manner described more fully below and having grooves 50 and 52 which provide shoulders 54 and 56 for engaging the back surface of the apertured panel. The head and shank sections are formed so that there is a generally axially extending passageway 58 therebetween adapted to accommodate an electrical conductor 60 or other element to be retained. In order to grip and thus hold the electrical conductor against axial movement relative to the grommet, the body portion 32 is provided with a rib 62 projecting into the central passageway 58, and the body portion 34 is provided with a complementary recess 64. With this structure the electric conductor is bent or folded into the recess 64 by the rib 62 when the body portions are assembled together so that the electrical conductor will be held as shown best in Fig. 2.

It should be noted that the elongated strap or hinge portion 36 has a relatively thin and narrow cross sectional shape so that it may be easily flexed to permit the body portions to be moved from the position shown in Figs. 6 and 7 into assembled relationship. Furthermore, it is important to note that the strap or hinge portion 36 extends between and integrally joins the entering end of the body portion. In combination with this, the entering ends of the body portion shank sections are rounded and tapered in the manner shown. With this structure the novel grommet of this invention may be easily applied to the electrical conductor or other element and also easily applied to the apertured workpiece or panel in the manner partially shown in Fig. 3. More specifically, the grommet body portions may be partially folded together and around the electrical conductor 60 as shown in Fig. 3. It should be noted that in this position the rib 62 has not yet caused the electrical conductor to be bent into the recess 64 or in other words, the body portion may be moved to this position without bending the electrical conductor so that this initial assembly may be accomplished easily. With the body portions in this partially assembled position finger portions 70 and 72 of the head section 38 and 40, respectively, traverse the electrical conductor in opposite directions and engage complementary guide surfaces on the head sections so that further assembly of the body portions to the position shown in Fig. 2 may be accomplished merely by pressing the body portions together with sufficient force to cause bending of the electrical conductor. In accordance with the present invention this may be easily accomplished merely by inserting the tapered entering end of the grommet into the panel aperture as shown in Fig. 3 and then forcing the grommet axially through the panel aperture until the head sections engage the outer surface of the panel. It will be appreciated that as this axial movement is accomplished, the tapering surfaces of the entering end and shank sections of the grommet will engage the edges of the panel aperture and cooperate therewith to cam the body portions of the grommet toward each other and into the positions shown in Fig. 2.

As shown in Figs. 4, 5 and 6, the hinge section 36 is offset from the center of the axial passageway 58 and the body portions are beveled as at 74 and 76 so as to provide an opening 78 in the entering end of the grommet through which the electrical conductor may easily pass. As shown in Figs. 1, 2 and 3, the shank sections of the body portions are formed so that when they are in their fully assembled positions, there is a narrow slot 80 therebetween. This slot permits the shank sections to be flexed together sufficiently to enable the shoulders 54 and 56 to be snapped behind the panel.

In Figs. 10 through 18 there is shown a strain relief grommet 30a embodying a modified form of the present invention, which grommet is similar to the above described structure as indicated by the application of identical reference numerals with the suffix "a" added to corresponding elements. This embodiment differs in that the shank sections 46a and 48a have portions 82 and 84 which are similar to the finger portions 70a and 72a of the head sections in that they completely traverse the axial passageway through the grommet and engage a complementary guide surface on the other shank section. In addition, the strap or hinge portion 36a is longer and narrower than the above described strap portion so that the body portions may be assembled together from their original positions as shown in Fig. 15 and Fig. 18, and also so that the hinge portion may be twisted to permit spreading and collapsing of the body portions while the finger portion of each head section is substantially in engagement with the complementary guide surface on the other head section. It will be appreciated that the grommet 30a may be applied to the electrical conductor or other element and to the apertured workpiece in the manner described above.

In Figs. 19 and 20 there is shown a novel grommet 30b which is similar to the above described structures as indicated by the application of identical reference numerals with the suffix "b" added to corresponding elements. In this embodiment the body portion 34b substantially completes the grommet except for a radial slot 88 which is as wide as the passageway 58b and through which the electrical conductor may be passed for insertion into the passageway. The body portion 32b is relatively small and serves to close the slot 88 and trap the electrical conductor. In addition, the body portion 32b carries an integral rib 62b which engages the electrical conductor to prevent movement thereof relative to the grommet when the body portion is fully inserted into the slot. It will be appreciated that the grommet 30b may be applied to the electrical conductor and to the apertured workpiece in substantially the same manner as the grommets described above.

From the above description it is seen that the present invention has provided a novel one-piece strain relief grommet which may be easily and economically molded from resilient plastic material. Furthermore, it is seen that the present invention has provided a novel grommet which may be easily applied to an electrical conductor or the like and which may also be easily applied to an apertured workpiece or panel. It should be noted that by providing the grommet of the present invention with a relatively flexible hinge portion having small transverse cross sectional dimensions, the body portions may be easily assembled together regardless of whether or not the grommet may warp after being ejected from the mold as sometimes occurs since the hinge may be distorted easily.

While the preferred embodiments of the present invention have been shown and described herein, it is obvious that many structural details may be changed without departing from the spirit and scope of the appended claims.

The invention is claimed as follows:

1. A one-piece strain relief grommet of molded plastic dielectric material adapted to be inserted axially and snapped into fixed position within the complementary aperture of a panel, said grommet including an axial shank comprising a pair of cooperating shank sections tapering toward and integrally joined at their entering extremities by a resilient hinge of reduced thickness to promote flexing thereof, the bending axis of which traverses the shank axis, said hinge serving to permit juxtapositioning of said shank sections for insertion within an aperture, a head portion associated with each shank section at the extremities oppositely disposed from the entering end thereof having an outwardly radiating surface for engaging one side of an apertured panel, shoulder means associated with at least one of said shank sections and spaced axially from the panel-engaging side of said head portions for engaging the opposite side of the panel, the juxtapositioned portions of the shank sections and said head portions having a longitudinal recess for accommodating an elongated conductor, and means extending from a wall defining said longitudinal recess for impinging a conductor to secure it in clamped position within the grommet, said hinge being of sufficiently reduced width to provide an opening at the entering end of the shank at least substantially as wide as the conductor-receiving space through the conductor impinging means when the shank sections are in conductor supporting position.

2. A one-piece strain relief grommet as claimed in claim 1, wherein said impinging means comprises a complementary rib and recess respectively to effect crimping of the conductor when in clamped position.

3. A one-piece strain relief grommet as claimed in claim 1, wherein said resilient hinge is angularly disposed to traverse the center axes of said shank sections.

4. A one-piece strain relief grommet as claimed in claim 1, wherein said resilient hinge is offset from the longitudinal recess to permit unimpaired egress of the conductor from the grommet.

5. A one-piece strain relief grommet of molded plastic dielectric material adapted to be inserted axially and snapped into fixed position within the complementary aperture of a panel for supporting an elongated conductor of given cross section, said grommet including an axial shank comprising a pair of cooperating shank sections tapering towards and integrally joined at their entering extremities by a resilient hinge of reduced thickness to promote flexing thereof, the bending axis of which traverses the shank axis, said hinge serving to permit juxtapositioning of said shank sections for insertion within an aperture, a head portion associated with each shank section at the extremity oppositely disposed from the entering end thereof having an outwardly radiating surface for engaging one side of an apertured panel, shoulder means associated with at least one of said shank sections and spaced axially from the panel engaging side of the head portion thereof for engaging the opposite side of the panel, the juxtapositioned portions of the shank sections and said head portions having a longitudinal recess for accommodating an elongated conductor of given cross section when the shank sections are in conductor supporting position, and conductor crimping means extending from a wall defining said longitudinal recess operable as an incident to lateral shifting of said shank sections toward each other for impinging a conductor to secure it in clamped position within the grommet, said hinge being so located with respect to the entering extremities of said shank sections and said longitudinal recess and being of such relatively small width as to provide an unobstructed opening adjacent the entering end of the shank of a size sufficient to receive the said conductor when the shank sections are in conductor clamping position.

6. A one-piece strain relief grommet as claimed in claim 5, wherein each head portion includes complemental parallel guide surfaces on opposite sides of the shank axis and angularly disposed relative to the crimping means for mutual cooperation as the head portions are pressed together during assembly.

References Cited in the file of this patent

UNITED STATES PATENTS

| | | |
|---|---|---|
| 2,424,756 | Klumpp | July 29, 1947 |
| 2,560,961 | Knohl | July 17, 1951 |
| 2,563,604 | Hultgren | Aug. 7, 1951 |